(12) United States Patent
Sugimoto et al.

(10) Patent No.: US 10,556,569 B2
(45) Date of Patent: Feb. 11, 2020

(54) VEHICULAR WIPER DEVICE

(71) Applicant: DENSO CORPORATION, Aichi-pref. (JP)

(72) Inventors: Norihiro Sugimoto, Toyohashi (JP); Yasuhide Ito, Toyokawa (JP); Shinichi Okada, Toyohashi (JP); Takafumi Negi, Hamamatsu (JP); Atsushi Kato, Toyohashi (JP); Kohei Shibata, Kosai (JP); Tomohiro Aoyama, Toyohashi (JP)

(73) Assignee: DENSO CORPORATION, Aichi-pref. (JP)

( * ) Notice: Subject to any disclaimer, the term of this patent is extended or adjusted under 35 U.S.C. 154(b) by 174 days.

(21) Appl. No.: 15/580,858

(22) PCT Filed: May 23, 2016

(86) PCT No.: PCT/JP2016/065210
§ 371 (c)(1),
(2) Date: Dec. 8, 2017

(87) PCT Pub. No.: WO2016/203906
PCT Pub. Date: Dec. 22, 2016

(65) Prior Publication Data
US 2018/0345912 A1    Dec. 6, 2018

(30) Foreign Application Priority Data

Jun. 17, 2015 (JP) ................................ 2015-122325
Jun. 23, 2015 (JP) ................................ 2015-125791
(Continued)

(51) Int. Cl.
*B60S 1/24* (2006.01)
*F16H 21/18* (2006.01)
(Continued)

(52) U.S. Cl.
CPC ................ *B60S 1/245* (2013.01); *B60S 1/18* (2013.01); *B60S 1/3402* (2013.01);
(Continued)

(58) Field of Classification Search
CPC .... B60S 1/3402; B60S 1/3404; B60S 1/3409; B60S 1/24; B60S 1/28; B60S 1/245;
(Continued)

(56) References Cited

U.S. PATENT DOCUMENTS 3,422,480 A    1/1969  Kato
4,665,351 A *  5/1987  Nyberg ................. B60S 1/0822
                                                        15/250.05

(Continued)

FOREIGN PATENT DOCUMENTS

EP    1669265 A1    6/2006
GB    2227926 A     8/1990
(Continued)

OTHER PUBLICATIONS

International Search Report corresponding to PCT/JP2016/065210, dated Jul. 5, 2016, two pages.

(Continued)

*Primary Examiner* — Gary K. Graham
(74) *Attorney, Agent, or Firm* — Kilpatrick Townsend & Stockton LLP

(57) ABSTRACT

A vehicular wiper device includes a first wiper arm, a first drive source, a rocking mechanism, a second drive source, an extension and retraction mechanism, and a control unit. A first wiper blade for wiping a surface to be wiped of a vehicle is connected to the front end of the first wiper arm. The first drive source is directly or indirectly affixed to the vehicle body. The rocking mechanism is driven by the drive force of the first drive source and reciprocates and rocks the first wiper arm. The second drive source is directly or indirectly affixed to the vehicle body separately from the first drive source. The extension and retraction mechanism is driven by the drive force of the second drive source and extends and retracts the first wiper arm in the longitudinal (Continued)

direction thereof. The control unit controls the drive of the first drive source and the second drive source so that the extension and retraction operation of the first wiper arm performed by the extension and retraction mechanism will correspond to the rocking operation of the first wiper arm performed by the rocking mechanism.

18 Claims, 13 Drawing Sheets

(30) Foreign Application Priority Data

| | | |
|---|---|---|
| Jun. 23, 2015 | (JP) | 2015-125792 |
| Jan. 4, 2016 | (JP) | 2016-000229 |
| Jan. 4, 2016 | (JP) | 2016-000230 |

(51) Int. Cl.
  *B60S 1/18* (2006.01)
  *B60S 1/34* (2006.01)
(52) U.S. Cl.
  CPC .......... *B60S 1/3409* (2013.01); *B60S 1/3493* (2013.01); *F16H 21/18* (2013.01)
(58) Field of Classification Search
  CPC ........ B60S 1/18; B60S 1/0859; B60S 1/0822; B60S 1/3493; F16H 21/18
  USPC .............. 15/250.21, 250.23, 250.16, 250.17, 15/250.13
  See application file for complete search history.

(56) References Cited

U.S. PATENT DOCUMENTS

| | | | |
|---|---|---|---|
| 4,683,605 A | | 8/1987 | Leroy et al. |
| 4,707,641 A | | 11/1987 | Guerard et al. |
| 4,780,926 A | * | 11/1988 | Kondo ................. B60S 1/0405 15/250.02 |
| 4,970,752 A | * | 11/1990 | Eustache ............... B60S 1/0402 15/250.16 |
| 5,181,293 A | * | 1/1993 | Baumgarten ........... B60S 1/365 15/250.21 |
| 5,301,383 A | * | 4/1994 | Suzuki ..................... B60S 1/20 15/250.23 |
| 5,306,991 A | | 4/1994 | Suzuki |
| 5,333,350 A | * | 8/1994 | Shirato .................... B60S 1/08 15/250.13 |
| 6,105,199 A | | 8/2000 | Irikura |
| 6,119,301 A | | 9/2000 | Nakatsukasa et al. |
| 6,782,580 B1 | | 8/2004 | Zimmer |

FOREIGN PATENT DOCUMENTS

| | | |
|---|---|---|
| JP | 46-36568 | 10/1971 |
| JP | S47-4247 | 2/1972 |
| JP | S61181745 A | 8/1986 |
| JP | S62113637 A | 5/1987 |
| JP | 62-139873 U | 11/1987 |
| JP | H03-5261 A | 1/1991 |
| JP | H1170858 A | 3/1999 |
| JP | H11170984 A | 6/1999 |
| JP | H11180258 A | 7/1999 |
| JP | H11227571 A | 8/1999 |
| JP | H11227572 A | 8/1999 |
| JP | H11321570 A | 11/1999 |
| JP | 2000095067 A | 4/2000 |
| JP | 2000103317 A | 4/2000 |
| JP | 2001106031 A | 4/2001 |
| JP | 2003512246 A | 4/2003 |

OTHER PUBLICATIONS

Translation of International Preliminary Report on Patentability corresponding to PCT/JP2016/065210, dated Dec. 19, 2017, six pages.

* cited by examiner

VEHICULAR WIPER DEVICE

TECHNICAL FIELD

The present invention relates to a vehicular wiper device.

BACKGROUND ART

Vehicles such as automobiles are equipped with vehicular wiper devices. One type of a wiper device pivots the wiper arm and the wiper blade about a single point. Another type of a wiper device includes a four-joint link mechanism to obtain a desired wiping range (substantially enlarged range) on the windshield (wiping surface) instead of a simple sectoral-shaped range (for example, refer to patent document 1).

In such a vehicular wiper device, a main lever (drive lever) is pivotally supported by the vehicle body) at the lower end side of the windshield. When the main lever is pivoted back and forth, the drive force of the main lever (drive lever) acts to pivot the other levers including an arm head following the main lever. This allows portions close to an upper corner of the windshield to be wiped. Such a portion would not be reached when the wiping range has a simple sectoral shape.

PRIOR ART DOCUMENT

Patent Document

Patent Document 1: Japanese Laid-Out Patent Publication No. 11-227572

PROBLEMS THAT ARE TO BE SOLVED BY THE INVENTION

When a vehicular wiper device uses the four-joint link mechanism, the levers directly set the wiping range. Thus, the wiping range is not variable and cannot be enlarged.

Accordingly, it is an object of the present invention to provide a vehicular wiper device that allows the wiping range to be enlarged in a variable manner.

Means for Solving the Problem

To achieve the above object, a vehicular wiper device according to one aspect of the present invention includes a first wiper arm, a first drive source, a swing mechanism, a second drive source, an extending mechanism, and a controller. The first wiper arm includes a distal end portion to which a first wiper blade is coupled to wipe a wiping surface of a vehicle. The first drive source is directly or indirectly fixed to a vehicle body. The swing mechanism is driven by drive force of the first drive source to swing the first wiper arm back and forth. The second drive source is separate from the first drive source and directly or indirectly fixed to the vehicle body. The extending mechanism is driven by drive force of the second drive source to extend or draw the first wiper arm in its longitudinal direction. The controller drives and controls the first drive source and the second drive source to extend or draw the first wiper arm with the extending mechanism in correspondence with a swinging action of the first wiper arm produced with the swing mechanism.

EMBODIMENTS OF THE INVENTION

One embodiment of a vehicle including a vehicular wiper device will now be described with reference to FIGS. 1 to 13.

Figure 1:
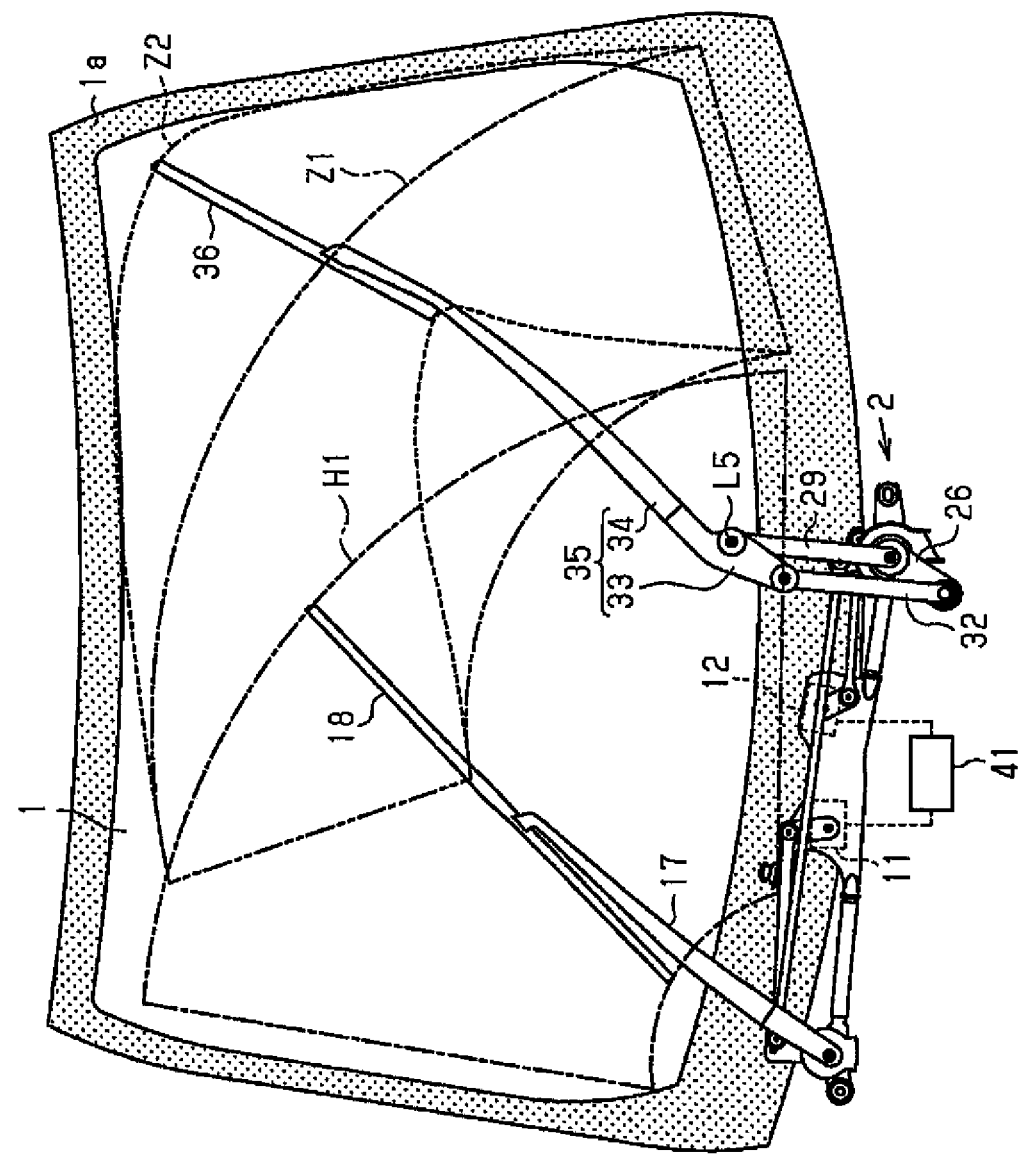
FIG. 1 is a schematic diagram showing part of a vehicle including a vehicular wiper device according to one embodiment of the present invention.

As shown in FIG. 1, a vehicular wiper device 2 is arranged downward (toward ground) from a windshield 1 that serves as a wiping surface of a vehicle. The rim of the windshield 1 is colored black by a black ceramic area 71a (shaded portion in FIG. 1).

As shown in FIGS. 2 and 4 to 8, the vehicular wiper device 2 includes a plate-like central frame 3, two pipe frames 4 and 5, and first and second holder members 6 and 7. The pipe frames 4 and 5 each include one end fixed to the central frame 3 so that the pipe frames 4 and 5 extend from the central frame 3 toward opposite sides in the widthwise direction of the vehicle. The first holder member 6 is connected to the other end of the pipe frame 4, and the second holder member 7 is connected to the other end of the pipe frame 5. A support 3a, which is arranged on the central frame 3 and supported by the vehicle, and fastening portions 6a and 7a, which are formed on the first and second holder members 6 and 7 and fastened to the vehicle, fix the vehicular wiper device 2 to the vehicle (vehicle body).

Further, the vehicular wiper device 2 includes a first motor 11, which serves as a first drive source directly or indirectly fixed to the vehicle body, and a second motor 12, which serves as a second drive source directly or indirectly fixed to the vehicle body. In the present embodiment, the first motor 11 and the second motor 12 are indirectly fixed to the vehicle body by the central frame 3. The first motor 11 and the second motor 12 are fixed to the rear surface (surface located toward inner side of vehicle) of the central frame 3.

The first motor 11 includes a rotation shaft 11a that extends through the central frame 3 and projects out of the front surface (surface located toward outer side of vehicle) of the central frame 3. A first drive crank arm 13 is fixed to a distal end portion of the rotation shaft 11a. The second motor 12 includes a rotation shaft 12a that extends through the central frame 3 and projects out of the front surface (surface located toward outer side of vehicle) of the central frame 3. A second drive crank arm 14 is fixed to a distal end portion of the rotation shaft 12a. The second motor 12 is a direct current motor that is controlled so that the rotation shaft 12a is rotatable in forward and reverse directions over a rotation angle that is less than a single rotation of the rotation shaft 12a (predetermined rotation angle in present embodiment). The first motor 11 and the second motor 12 each accommodate a magnetic sensor (magnetoresistance element or the like). The magnetic sensors are capable of sensing magnetism of a sensor magnet fixed to, for example, a worm wheel that is rotated integrally with the rotation shafts 11a and 12a to output rotation position signals corresponding to the rotation positions (rotation angles) of the rotation shafts 11a and 12a.

The first holder member 6 supports a driver seat side pivot shaft 15 in a rotatable manner. The driver seat side pivot shaft 15 includes a basal end portion (end portion located with respect to plane of FIG. 2) and a distal end portion (end portion located downward with respect to plane of FIG. 2). A basal end portion of a driver seat side swing lever 16 is fixed to the basal end portion of the driver seat side pivot shaft 15. A driver seat side second wiper arm 17 (its arm head) is fixed to the distal end portion of the driver seat side pivot shaft 15. As shown in FIG. 1, a second wiper blade 18 is coupled to a distal end portion of the second wiper arm 17 to wipe the driver seat side of the windshield 1.

A distal end portion of the first drive crank arm 13 is coupled to a distal end portion of the driver seat side swing lever 16 by a first coupling rod 19. Thus, when the first motor 11 is driven, the first drive crank arm 13 is pivoted. The force of the first drive crank arm 13 is transmitted via the first coupling rod 19 to the driver seat side swing lever 16. This swings the driver seat side swing lever 16. The second wiper arm 17 swings together with the driver seat side swing lever 16 to move the second wiper blade 18 back and forth. This wipes the driver seat side of windshield 1 in a range between an upper reversing position and a lower reversing position. In FIG. 1, the single-dashed lines indicate a normal wiping range H1 of the second wiper blade 18.

Figure 3:
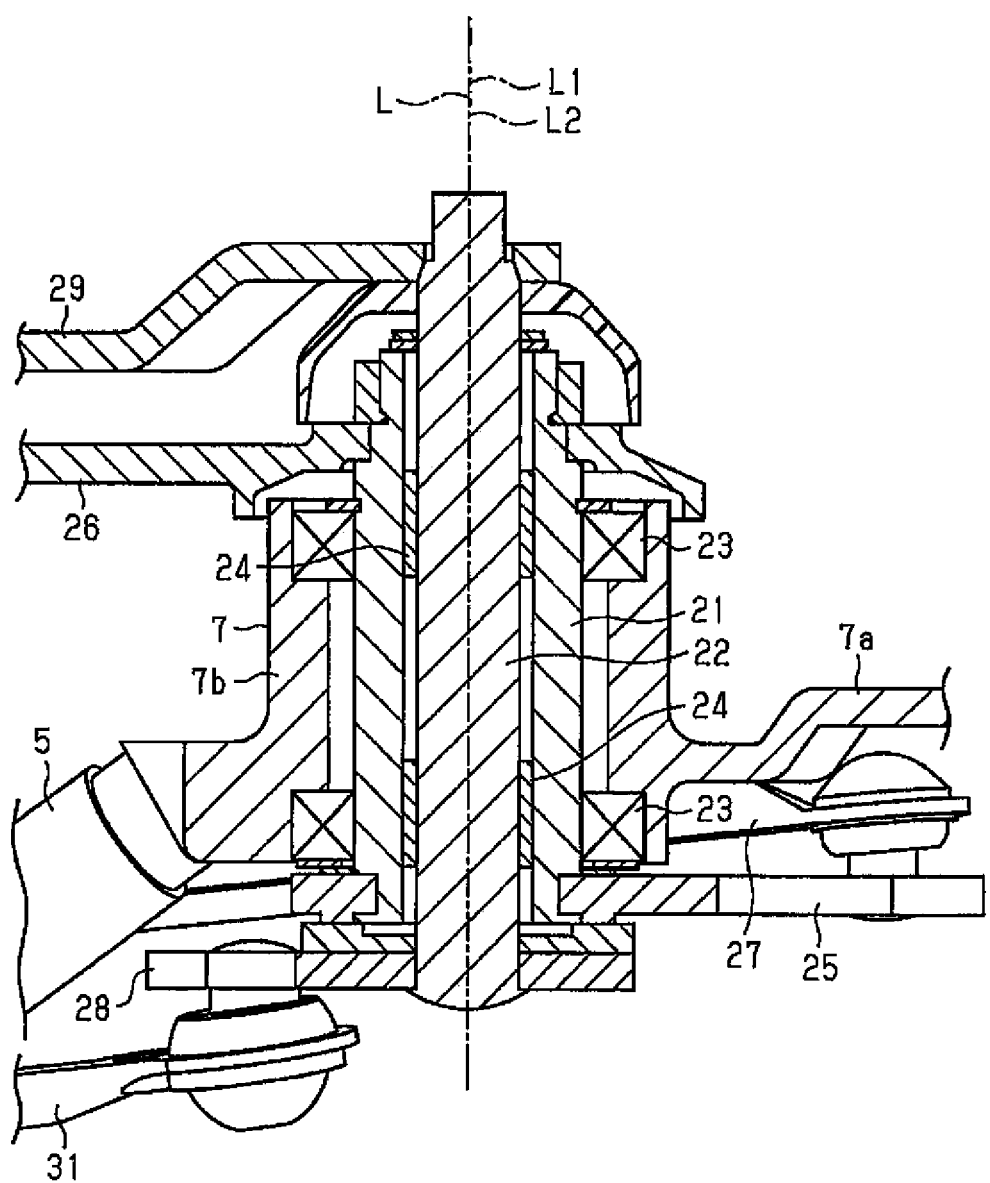
FIG. 3 is a cross-sectional view taken along line A-A in FIG. 2.

As shown in FIG. 3, the second holder member 7 supports a first passenger peat side pivot shaft 21 in a manner rotatable about the first axis L1 and a second passenger seat pivot shaft 22 in a manner rotatable about a the second axis L2. In the present embodiment, the first axis L1 and the second axis L2 lie along the same line L (concentrically).

In detail, the second holder member 7 includes a tube 7b. The inner circumferential surface of the tube 7b supports the first passenger seat side pivot shaft 21 in a rotatable manner with bearings 23. The first passenger seat side pivot shaft 21 is tubular. The inner circumferential surface of the first passenger seat side pivot shaft 21 supports the second passenger seat pivot shaft 22 in a rotatable manner with bearings 24. Consequently, the first axis L1 of the first passenger seat side pivot shaft 21 and the second axis L2 of the second passenger seat pivot shaft 22 are located at a fixed position (stationary position) relative to the vehicle body and lie along the same line L.

Figure 2:
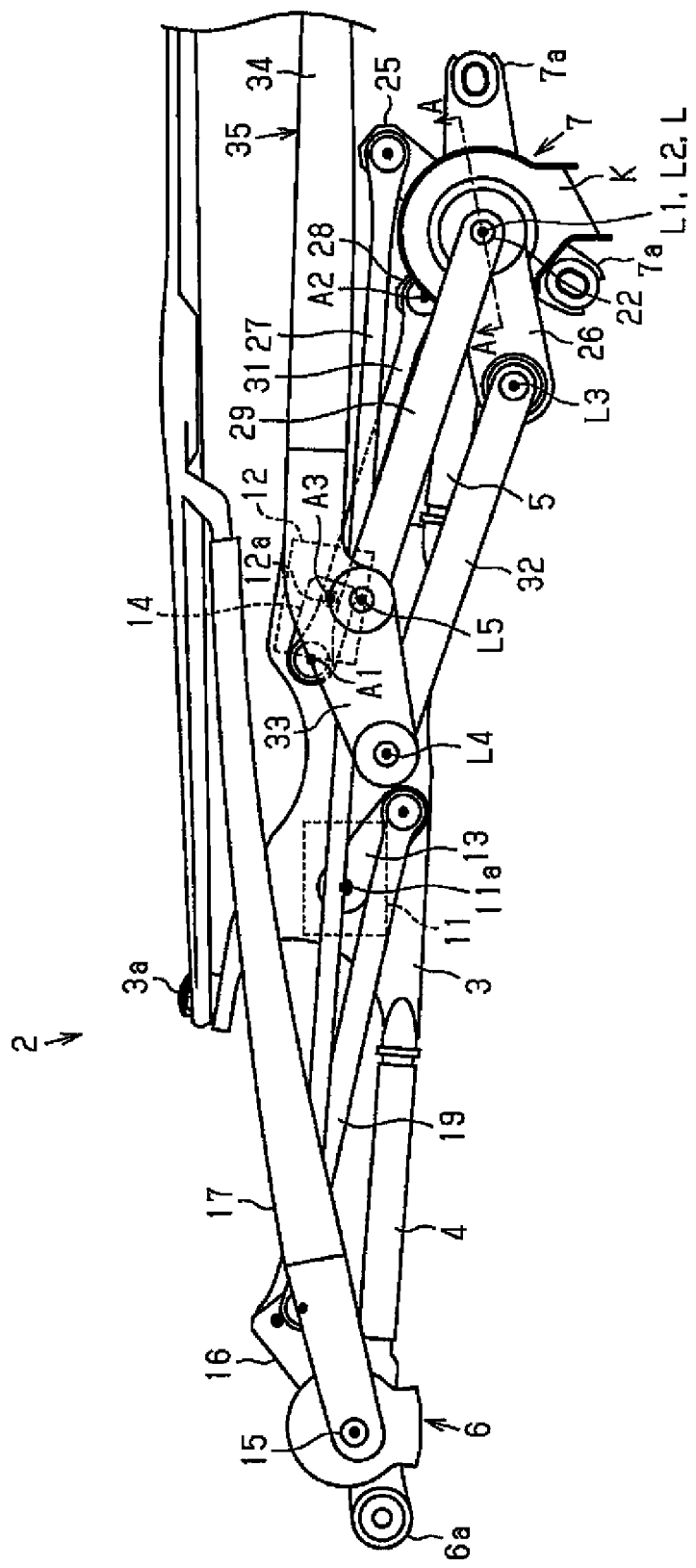
FIG. 2 is a plan view of the vehicular wiper device shown in FIG. 1.

A basal end portion of a first passenger seat side swing lever 25 is fixed to the basal end portion of the first passenger seat side pivot shaft 21. A basal end portion of a first drive lever 26 is fixed to the distal end portion of the first passenger seat side pivot shaft 21. As shown in FIG. 2, a distal end portion of the first passenger seat side swing lever 25 is coupled to a distal end portion of the driver seat side swing lever 16 by a second coupling rod 27. Thus, when the first motor 11 is driven and the driver seat side swing lever 16 swings as described above, the drive force is transmitted by the second coupling rod 27 to the first passenger seat side swing lever 25. This swings the first passenger seat side swing lever 25, and the first drive lever 26 swings (pivots) together with the first passenger seat side swing lever 25 about the first axis L1.

As shown in FIG. 3, the second passenger seat pivot shaft 22 is longer than the first passenger seat side pivot shaft 21. The basal end portion and the distal end portion of the second passenger seat pivot shaft 22 project out of the first passenger seat side pivot shaft 21 in the axial direction. A basal end portion of a second passenger seat side swing lever 28 is fixed to the basal end portion of the second passenger seat pivot shaft 22. A basal end portion of a second drive lever 29 is fixed to the distal end portion of the second passenger seat pivot shaft 22.

A distal end portion of the second drive crank arm 14 is coupled to a distal end portion of the second passenger seat side swing lever 28 by a third coupling rod 31. Thus, when the second motor 12 is driven, the second drive crank arm 14 is pivoted. The force of the second drive crank arm 14 is transmitted by the third coupling rod 31 to the second passenger seat side swing lever 28. This swings the second passenger seat side swing lever 28. The second drive lever 29 swings (pivots) together with the second passenger seat side swing lever 28. The first passenger seat side pivot shaft 21 and the second passenger seat pivot shaft 22 do not move in cooperation with each other. In other words, the first passenger seat side pivot shaft 21 and the second passenger seat pivot shaft 22 lie along the same line L but are separately rotated. FIGS. 2 and 4 to 8 show a waterproof cover K on the second holder member 7. However, the waterproof cover K is not shown in FIG. 3.

As shown in FIGS. 2 and 4 to 8, the vehicular wiper device 2 includes a first driven lever 32. A basal end portion of the first driven lever 32 is coupled to the first drive lever 26 in a manner pivotal about a third axis L3 that is located on a distal end portion of the first drive lever 26.

Further, the vehicular wiper device 2 includes an arm head 33 serving as a second driven lever. The arm head 33 includes a basal end portion, coupled to the first driven lever 32 in a manner pivotal about a fourth axis L4 located on a distal end portion of the first driven lever 32, and a distal end portion, coupled to the second drive lever 29 in a manner pivotal about a fifth axis L5 (swing axis) located on a distal end portion of the second drive lever 29. As shown in FIG. 1, a retainer 34 is coupled to a distal end portion of the arm head 33. The arm head 33, the retainer 34, an arm piece (not shown), and the like form a first wiper arm 35. A first wiper blade 36 is coupled to a distal end portion of the first wiper arm 35 to wipe a passenger seat side of the windshield 1.

The first drive lever 26, the second drive lever 29, the first driven lever 32, and the arm head 33 are coupled so that the length from the first axis L1 (second axis L2) to the third axis L3 and the length from the fourth axis L4 to the fifth axis L5 are set to be the same. Further, the first drive lever 26, the second drive lever 29, the first driven lever 32, and the arm head 33 are coupled so that the length from the third axis L3 to the fourth axis L4 and the length from the first axis L1 (second axis L2) to the fifth axis L5 are set to be the same.

This obtains a link mechanism in the form of parallelogram that keeps the first drive lever 26 parallel to the arm head 33 and the second drive lever 29 parallel to the first driven lever 32. In the present embodiment, the first drive lever 26, the first driven lever 32, and the arm head 33 form a swing mechanism and a swing link mechanism that swings the first wiper arm 35 back and forth when driven by the first motor 11. In the present embodiment, the second drive lever 29 forms an extending mechanism that extends or draws the first wiper arm 35 in the longitudinal direction when driven by the drive force of the second motor 12. The second drive lever 29 also forms an axis moving mechanism that moves the swing axis (fifth axis L5) of the first wiper arm 35 in the top-to-bottom direction of the windshield 1. In detail, the second drive lever 29 is driven by the drive force of the second motor 12 to move the first wiper arm 35 in its longitudinal direction between a position distant from the first axis L1 of the first passenger seat side pivot shaft 21 and a position proximate to the first axis L1 of the first passenger seat side pivot shaft 21. In other words, the distance from the first axis L1 of the first passenger seat side pivot shaft 21 to a longitudinal distal end of the wiper arm 35 is increased and decreased.

In the structure described above, when the first drive lever 26 is pivoted by the drive force of the first motor 11 to perform a wiping action with the first wiper blade 36, the vehicular wiper device 2 pivots the second drive lever 29 with the drive force of the second motor 12 to move the fifth axis L5 located on the distal end portion of the second drive lever 29 toward the upper side of the windshield 1. This allows the wiping range of the first wiper blade 36 to be enlarged.

Referring to FIG. 1, in the present embodiment, the position of the fifth axis L5 when the first wiper blade 36 is located at the lower reversing position on the windshield 1 is defined as a standard position. The wiping range of the first wiper blade 36 in a state in which the fifth axis L5 is located at the standard position is defined as a standard range Z1. The wiping range of the first wiper blade 36 in a state in which the fifth axis L5 is located toward the upper side of the windshield 1 from the standard position is defined as an enlarged range Z2, which is enlarged from the standard range Z1. The vehicular wiper device 2 includes a controller 41 that drives and controls the first motor 11 and the second motor 12 to switch between standard drive that moves the first wiper blade 36 to wipe the standard range Z1 and enlargement drive that moves the first wiper blade 36 to wipe the enlarged range Z2. The controller 41 is electrically connected to the first motor 11 and the second motor 12 to drive and control the first motor 11 and the second motor 12 based on rotation position signals (drive state signals) input from the first motor 11 and the second motor 12 in correspondence with the rotation positions (rotation angle) of the rotation shafts 11a and 12a. In detail, if the standard position is set to the position of the fifth axis L5 when the first wiper blade 36 is located at the lower reversing position, during the standard drive, the controller 41 drives and controls the first motor 11 (here, second motor 12 is in stopped state) with the fifth axis L5 located at the standard position (position of FIGS. 2, 7, and 8) so that the first wiper blade 36 wipes the standard range Z1. In other words, during the standard drive, the controller 41 wipes the standard range Z1 with the first wiper blade 36 without swinging (pivoting) the second drive lever 29 about the second axis L2 (without driving extending mechanism (axis moving mechanism)), while keeping the fifth axis L5 at the standard position (driving only swing mechanism (swing link mechanism)). During the enlargement drive, the controller 41 drives and controls the first motor 11 and the second motor 12 (drives extending mechanism (axis moving mechanism) and swing mechanism (swing link mechanism) so that the first wiper blade 36 wipes the enlarged range Z2, which is enlarged from the standard range Z1 when (or as) the fifth axis L5, which is located on the distal end portion of the second drive lever 29, moves toward the upper side on the windshield 1 from the standard position (refer to FIGS. 1 and 4 to 6).

The controller 41 of the present embodiment drives and controls the second motor 12 to perform the enlargement drive when the first wiper blade 36 moves forth (moves from lower reversing position or stop position at lower end of windshield 1 to upper reversing position) and perform the standard drive when the first wiper blade 36 moves back (moves from upper reversing position to stop position or lower reversing position). In the enlargement drive, as the controller 41 pivots the first drive lever 26 with the drive force of the first motor 11 and moves the first wiper blade 36, the controller 41 simultaneously drives and controls the second motor 12 so that the first wiper blade 36 wipes locations proximate to an upper corner of the windshield 1. More specifically, based on the rotation position signals from first motor 11 and the second motor 12, the controller 41 drives and controls the second motor 12 so that the fifth axis L5, which is the pivot center of the first wiper blade 36 located on the distal end portion of the second drive lever 29, approaches the corner when moving the first wiper blade 36 to a location corresponding to the upper corner of the windshield 1.

The second motor 12 and the second drive lever 29 are linked by a rotation restriction link mechanism (second drive crank arm 14, third coupling rod 31, and second passenger seat side swing lever 28) that is set to be at a dead center when the fifth axis L5 is located at the standard position so that the rotation shaft 12a of the second motor 12 cannot be rotated even if rotation force is applied to the second drive lever 29. More specifically, the second drive crank arm 14, the third coupling rod 31, and the second passenger seat side swing lever 28 are set so that when the fifth axis L5 is located at the standard position (refer to FIGS. 2, 7, and 8), their coupling axes A1 and A2 and an axis A3 of the rotation shaft 12a of the second motor 12 lie along a straight line as viewed in the axial direction.

In the vehicular wiper device 2 of the present embodiment, the first drive lever 26 is swung (pivoted) in a range located downward on the windshield 1 from the first axis L1 when driving the first motor 11. In other words, the first drive lever 26 is set so as not to swing (pivot) upward from the first axis L1.

Figure 9:
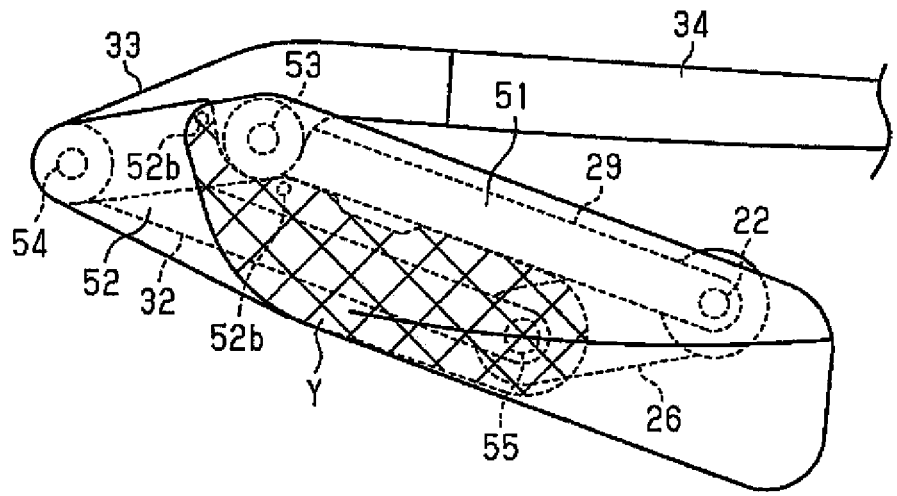
FIG. 9 is a plan view illustrating cover members arranged on the vehicular wiper device shown in FIG. 2.
Figure 10:
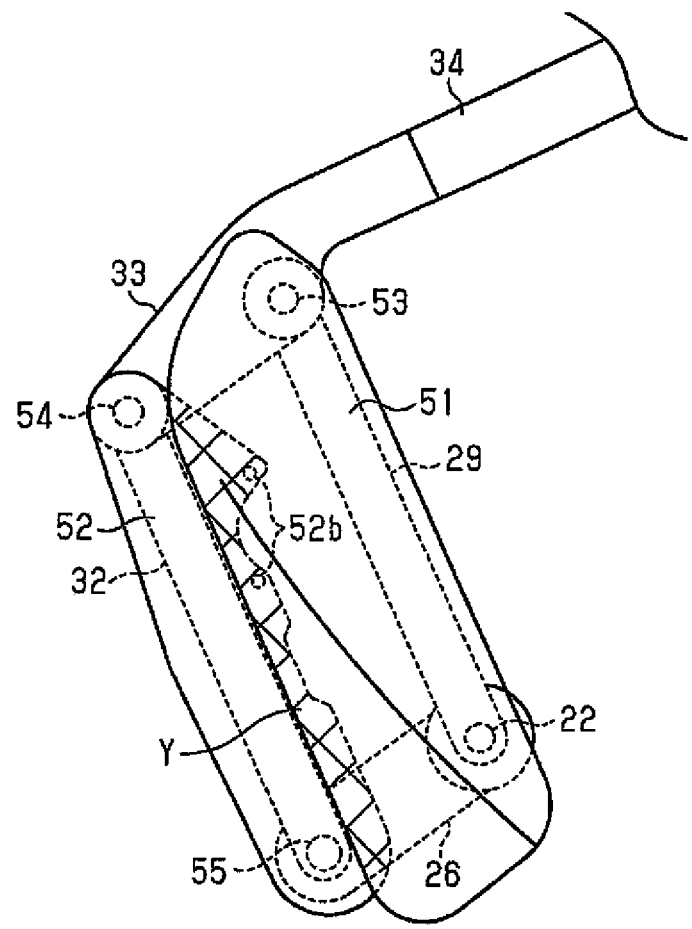
FIG. 10 is a plan view illustrating the cover members shown in FIG. 9.
Figure 11:
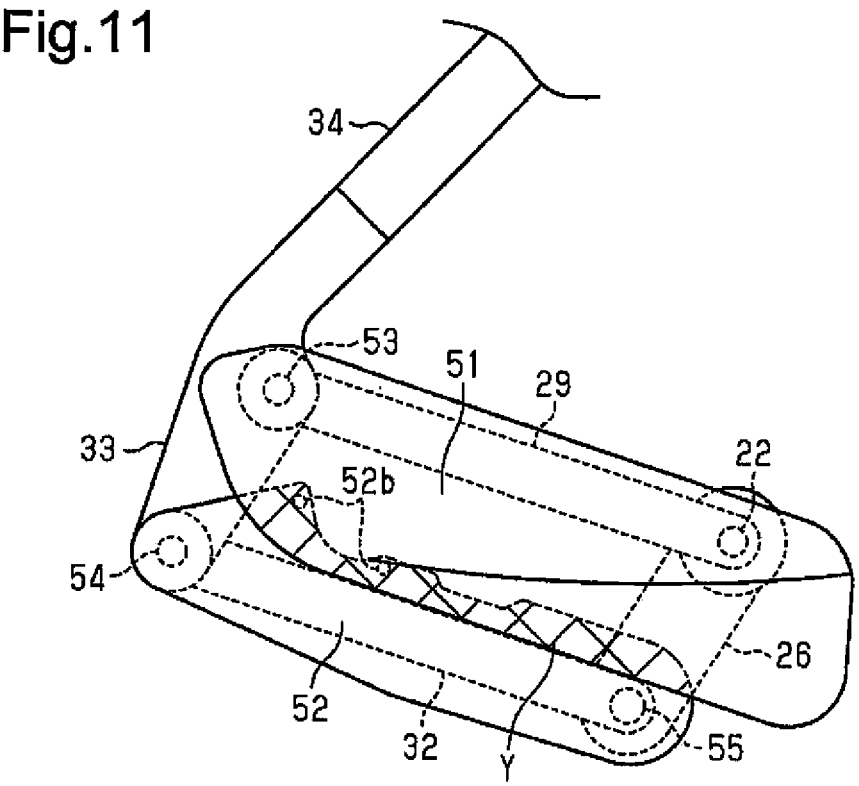
FIG. 11 is a plan view illustrating the cover members shown in FIG. 9.

As shown in FIGS. 9 to 11, in the vehicular wiper device 2 of the present embodiment, plate-like cover members 51 and 52 are respectively arranged on the second drive lever 29 and the first driven lever 32 to extend over and cover the section encompassed by the levers (first drive lever 26, second drive lever 29, first driven lever 32, and arm head 33). In detail, the cover member 51 arranged on the second drive lever 29 extends toward the first driven lever 32 to cover the encompassed section. The cover member 52 arranged on the first driven lever 32 extends toward the second drive lever 29 to cover the encompassed section. The two cover members 51 and 52 include overlapping portions Y of which the overlapping area varies in accordance with the pivot state of the levers (first drive lever 26, second drive lever 29, first driven lever 32, and arm head 33). In FIGS. 9 to 11, the overlapping portion Y is marked to facilitate visual recognition. In detail, the two cover members 51 and 52 are formed so that, in accordance with the pivot state of the levers (first drive lever 26, second drive lever 29, first driven lever 32, and arm head 33), the area of the overlapping portion Y is decreased when the section encompassed by the lever is increased (refer to FIGS. 10 and 11), and the area of the overlapping portion Y is increased when the encompassed section decreases (refer to FIG. 9).

Figure 12:
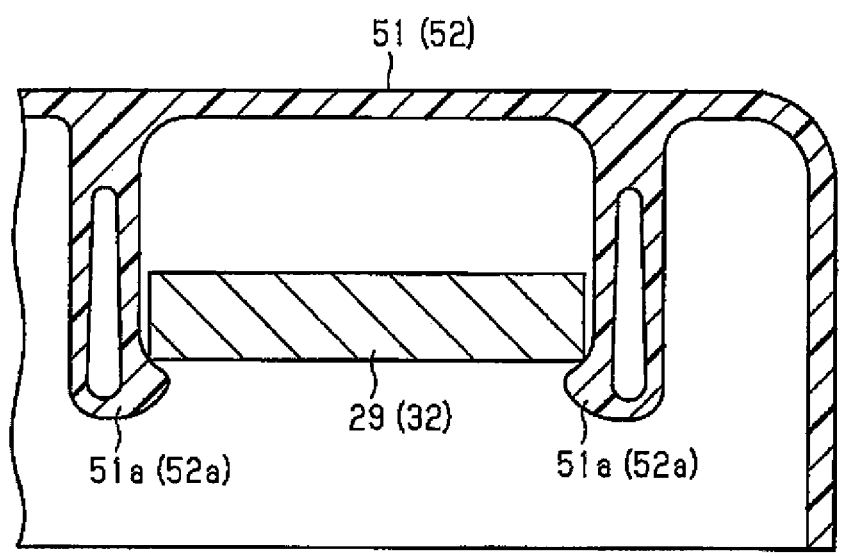
FIG. 12 is a cross-sectional view illustrating a fastening structure of the cover members shown in FIG. 9.

As shown in FIG. 12, in the present embodiment, the cover member 51 (52), which is made of resin, includes two claws 51*a* (52*a*) on an inner surface (surface closer to wiping surface). The second drive lever 29 (the first driven lever 32) is fitted into and fixed between the claws 51*a* (52*a*). Thus, the second drive lever 29 is held by the claws 51*a* (52*a*).

As shown in FIGS. 9 to 11, the cover members 51 and 52 are formed to constantly cover (in any pivot state) the entire section encompassed by the levers (first drive lever 26, second drive lever 29, first driven lever 32, and arm head 33)

The cover members 51 and 52 are formed to cover the second passenger seat pivot shaft 22 and coupling pins 53 to 55, which serve as pivot pins of the levers (first drive lever 26, second drive lever 29, first driven lever 32, and arm head 33). In the present embodiment, the cover member 51, which is fixed to the second drive lever 29, constantly covers the coupling pin 53 and the second passenger seat pivot shaft 22, which are located on the two ends of the second drive lever 29. Further, the cover member 52, which is fixed to the first driven lever 32, constantly covers the coupling pins 54 and 55, which are located on the two ends of the first driven lever 32.

The cover members 51 and 52 are formed so that when the first wiper arm 35 and the first wiper blade 36 extend along the lower end of the windshield 1 at the stop position, the cover member 51 arranged on the second drive lever 29 located at the upper side (upper side of windshield 1) lies over the outer surface (surface located upward with respect to plane of FIG. 9) of the cover member 52 arranged on the first driven lever 32 located downward from (toward inside of vehicle body) the second drive lever 29.

Figure 13:
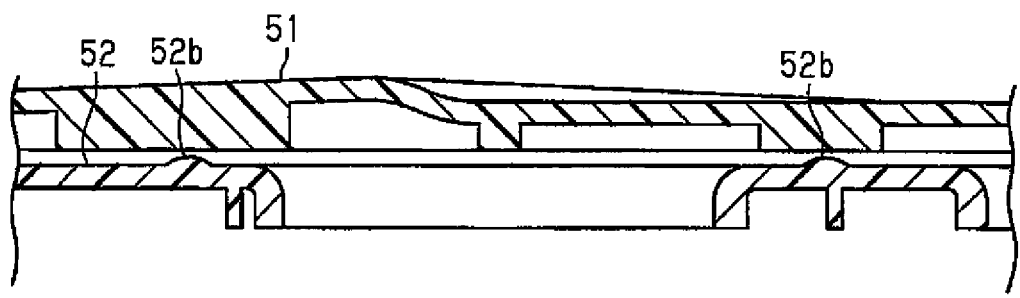
FIG. 13 is a plan view illustrating projections of the cover member shown in FIG. 9.

As shown in FIG. 13, the surfaces of the cover members 51 and 52 that overlap each other (in FIG. 13, inner surface of cover member 51 or outer surface of cover member 52) includes projections 52*b*. In the present embodiment, the projections 52*b* are formed on the outer surface (upper surface as viewed in FIG. 13) of the cover member 52, which is arranged on the first driven lever 32. As shown in FIGS. 9 to 11, the projections 52*b* are formed on the cover member 52 at positions corresponding to the overlapping portion Y. In detail, the projections 52*b* are formed on the cover member 52 at positions that are always (in any pivot state) faced toward the cover member 51. As shown in FIG. 13, in a state in which the cover members 51 and 52 are not elastically deformed (free from loads) or plastically deformed, the projections 52*b* are spaced apart by slight gaps from the cover member 51. The present embodiment includes two projections 52*b* that are semispherical projections.

The operation of the vehicular wiper device 2 will now be described.

When the first motor 11 is driven, the second wiper arm 17 and the second wiper blade 18 are driven in synchronism with the first wiper arm 35 and the first wiper blade 36 and simply pivoted (swung) only about the driver seat side pivot shaft 15. The movement of the first wiper arm 35 and the first wiper blade 36 will now be described in detail.

Referring to FIG. 2, for example, when a wiper switch or a windshield washer switch arranged in front of a driver seat is operated in a state in which the first wiper arm 35 (and first wiper blade 36) is located at the stop position, the controller 41 drives the first motor 11 and pivots the first drive lever 26 with the drive force of the first motor 11. During forward movement, the controller 41 drives the second motor 12 to produce the enlarging action.

Figure 4:
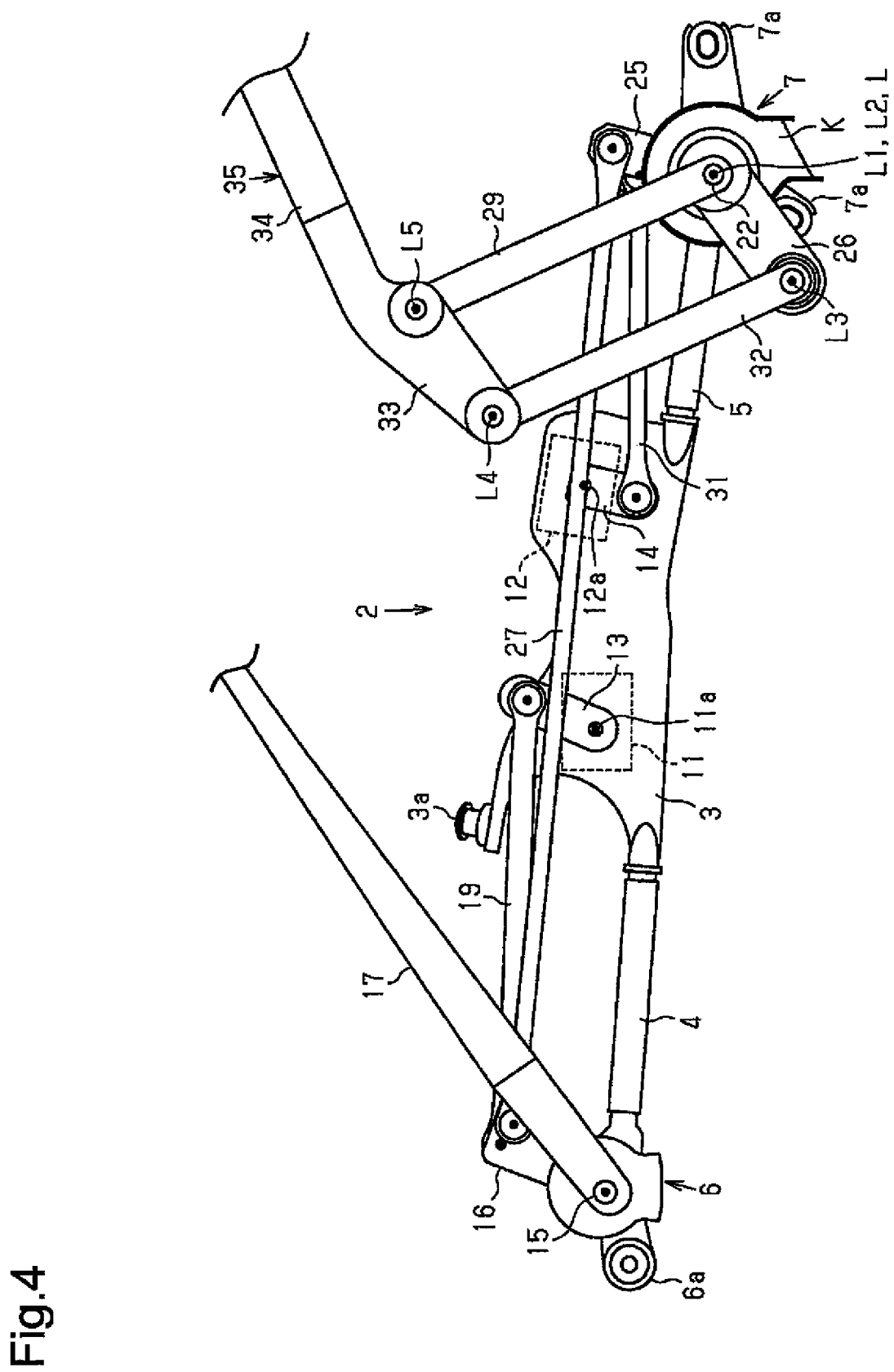
FIG. 4 is a plan view illustrating an action of the vehicular wiper device shown in FIG. 2.

Here, referring to FIG. 4, the second drive lever 29 is also pivoted to move the fifth axis L5 toward the upper side of the windshield 1 before the pivoting first drive lever 26 moves forth the first wiper arm 35 (and first wiper blade 36) over approximately one-fourth of the distance between the upper and lower reversing positions. The distal end portion of the first wiper blade 36 (refer to FIG. 1) moves upward along a widthwise end of the windshield 1 and wipes the windshield 1.

Figure 5:
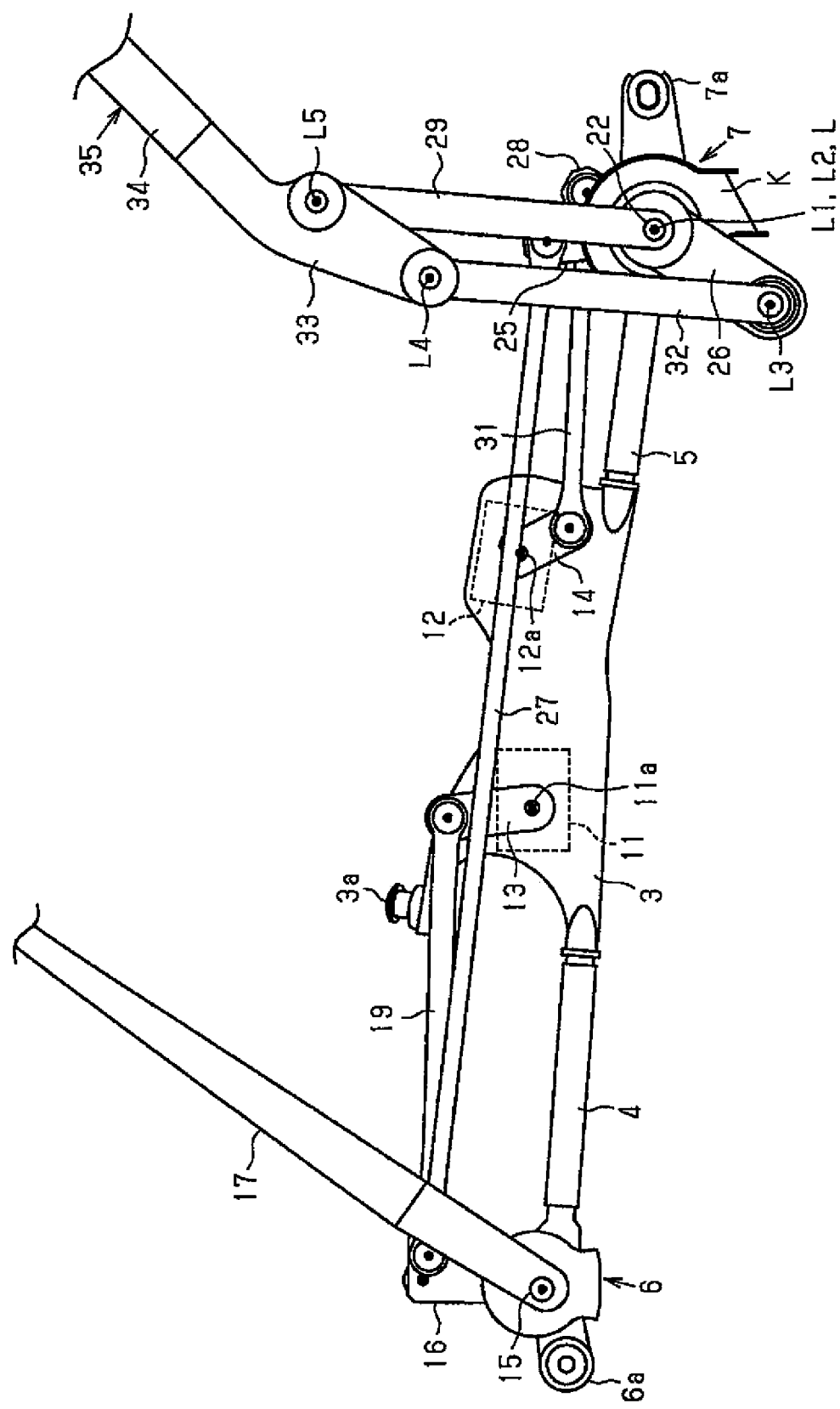
FIG. 5 is a plan view illustrating an action of the vehicular wiper device shown in FIG. 2.

Referring to FIG. 5, the second drive lever 29 is further pivoted to move the fifth axis L5 further upward before the pivoting of the first drive lever 26 further moves forth the first wiper arm 35 (and first wiper blade 36) over approximately one-half of the distance between the upper and lower reversing positions. As shown in FIG. 1, the distal end portion of the first wiper blade 36 moves to a position proximate to an upper corner of the windshield 1 and wipes the windshield 1.

Figure 6:
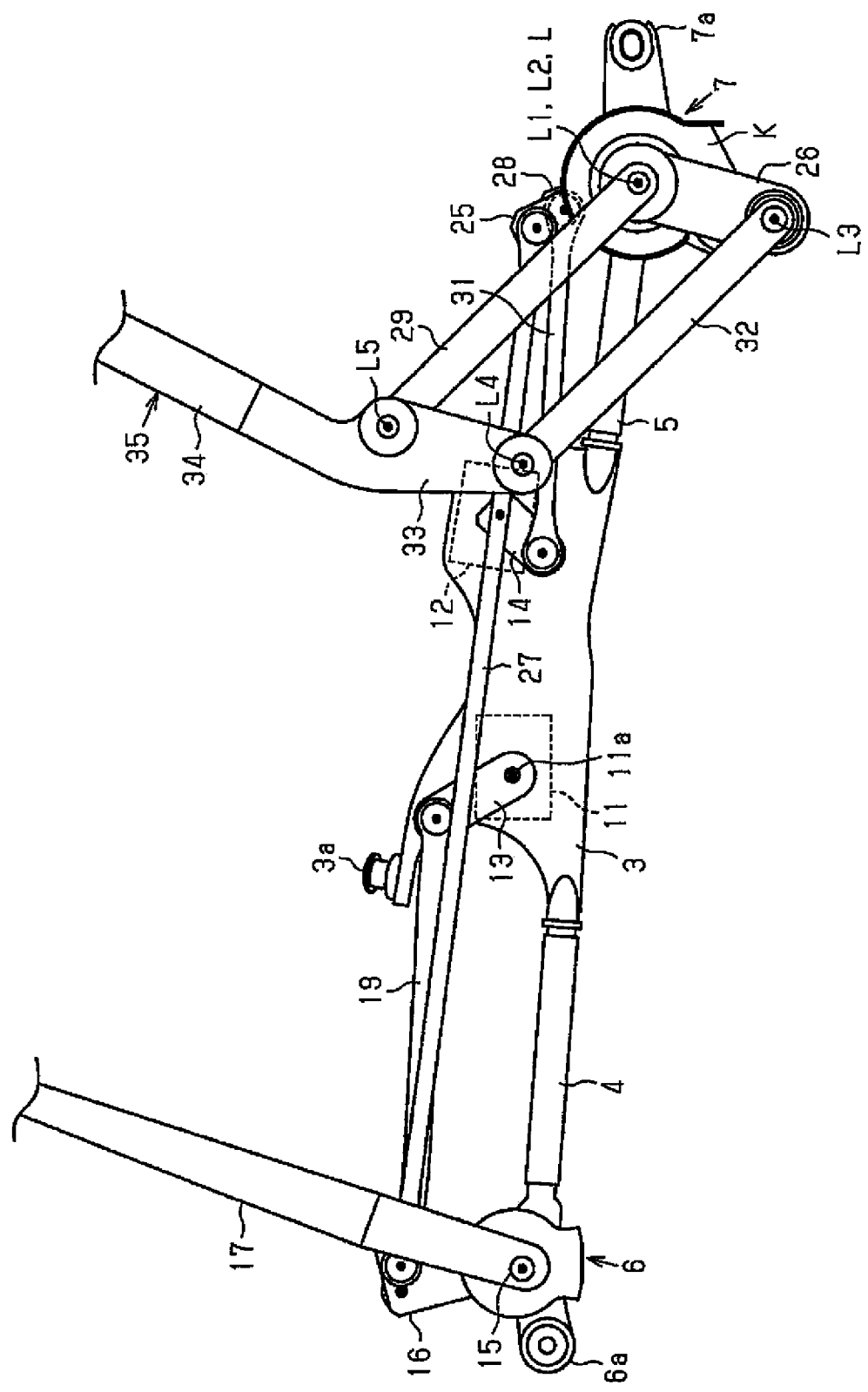
FIG. 6 is a plan view illustrating an action of the vehicular wiper device shown in FIG. 2.

Referring to FIG. 6, the second drive lever 29 is pivoted toward the lower side of the windshield 1 (reverse direction) to move the fifth axis L5 downward before the pivoting of the first drive lever 26 further moves forth the first wiper arm 35 (and first wiper blade 36) over approximately three-fourth of the distance between the upper and lower reversing positions. This moves the distal end portion of the first wiper blade 36 (refer to FIG. 1) substantially along the upper end of the windshield 1 in the widthwise direction (leftward direction in FIG. 1) and wipes the windshield 1.

Figure 7:
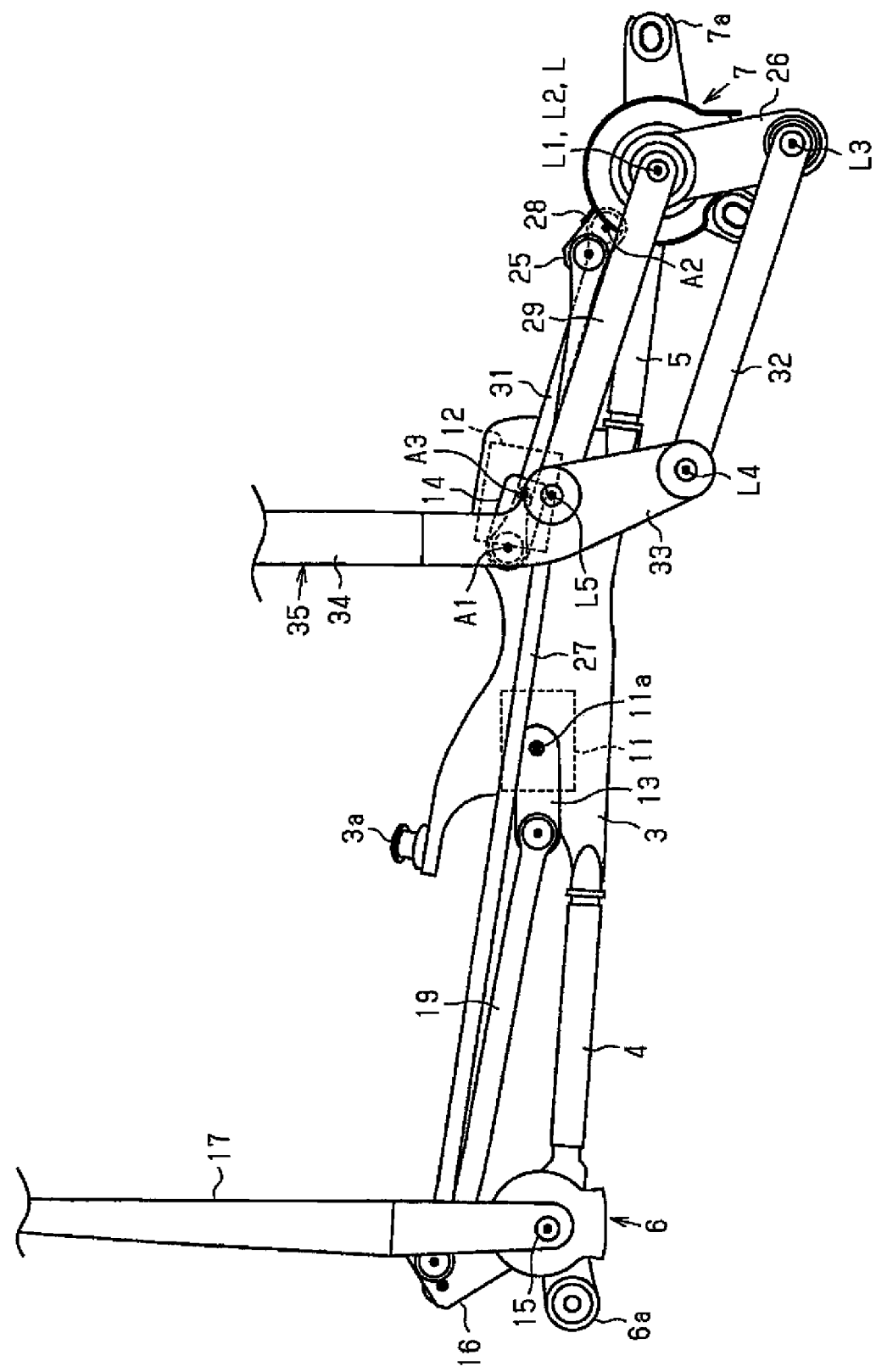
FIG. 7 is a plan view illustrating an action of the vehicular wiper device shown in FIG. 2.

Referring to FIG. 7, the second drive lever 29 is pivoted (in reverse direction) to further move the fifth axis L5 downward to the standard position before further pivoting of the first drive lever 26 ends the forward movement of the first wiper arm 35 (first wiper blade 36). In this manner, the windshield 1 is wiped by the first wiper blade 36 (refer to FIG. 1) over the enlarged range Z2. When the fifth axis L5 reaches the standard position, the rotation restriction link mechanism (second drive crank arm 14, third coupling rod 31, and second passenger seat side swing lever 28), which links the second motor 12 (rotation shaft 12*a*) and the second drive lever 29, is located at the dead center where the rotation shaft 12*a* of the second motor 12 cannot be rotated even when rotation force (external force) is applied to the second drive lever 29.

Figure 8:
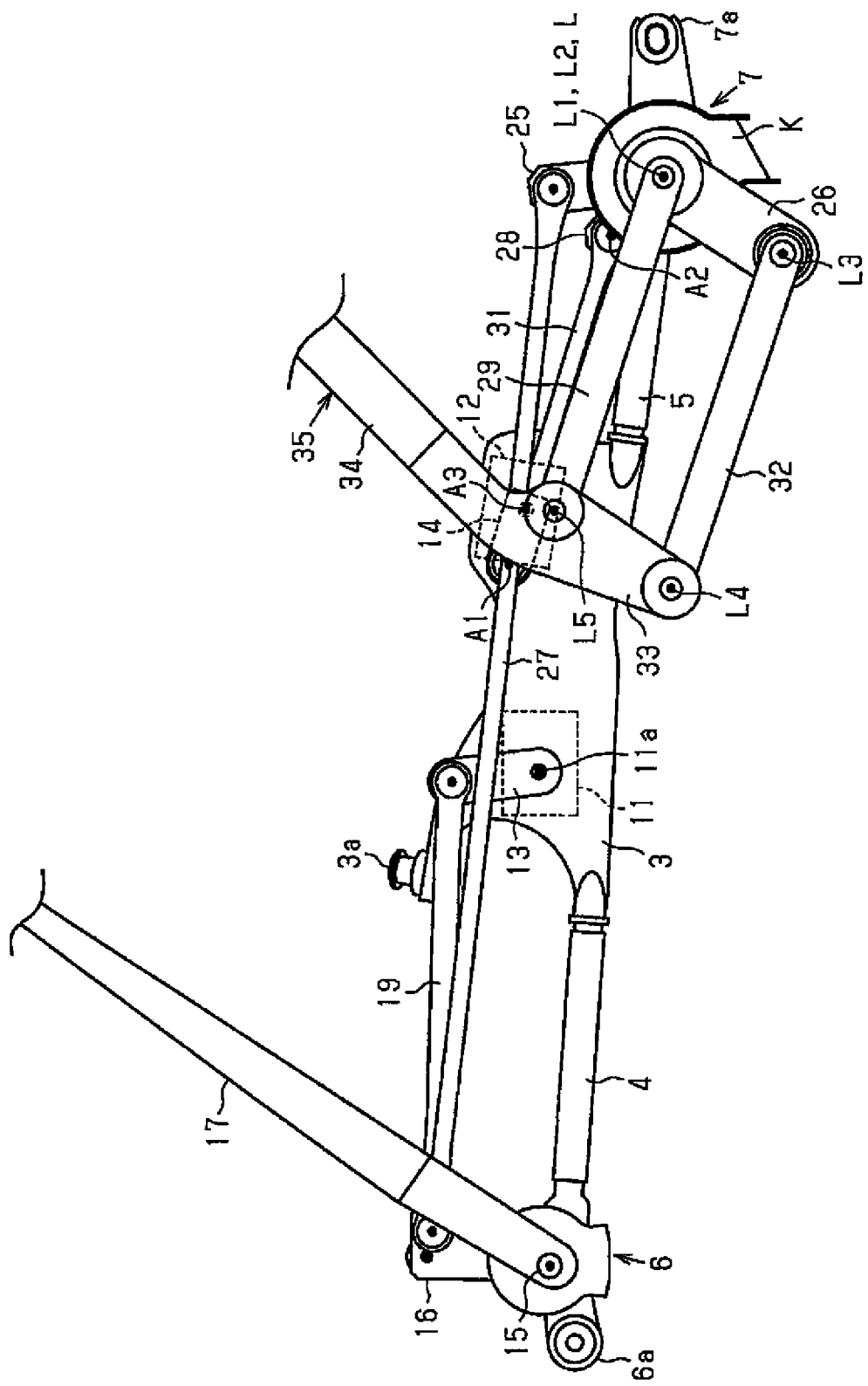
FIG. 8 is a plan view illustrating an action of the vehicular wiper device shown in FIG. 2.

Referring to FIG. 8, when the first wiper arm 35 (and first wiper blade 36) moves back toward the stop position, the standard action is performed in a state in which the controller 41 interrupts the supply of power to the second motor 12 and stops the second drive lever 29 at the dead center where the fifth axis L5 is located at the standard position (same position as position of fifth axis L5 when first wiper blade 36 is located at lower reversing position). This wipes the windshield 1 with the first wiper blade 36 (refer to FIG. 1) over the standard range Z1.

Referring to FIGS. 9 to 11, the area of the section encompassed by the levers (first drive lever 26, second drive lever 29, first driven lever 32, and arm head 33) is varied in area and shape during the wiping action. Nevertheless, the variable area of the overlapping portion Y of the cover members 51 and 52 constantly covers the entire enclosed range (in any state) with the cover members 51 and 52. This prevents foreign matter, such as snow or twigs, from being caught between the levers.

The advantages of the above embodiment will now be described.

(1) The driving force of the first motor 11 drives the swing mechanism (swing link mechanism), the first wiper arm 35 swings back and forth, the driving force of the second motor 12 drives the extending mechanism (axis moving mechanism), and the first wiper arm 35 is extended and drawn in its longitudinal direction. The controller 41 controls the first motor 11 and the second motor 12 to extend or draw the first wiper arm 35 with the extending mechanism in correspondence with the swinging of the first wiper arm 35 performed by the swing mechanism. This allows the wiping range of the first wiper blade 36 to be enlarged (to enlarged range Z2). Thus, positions proximate to the upper corners of the windshield 1 can be wiped.

(2) In the above structure, when the drive force of the first motor 11 pivots the first drive lever 26 and performs wiping with the first wiper blade 36, the second drive lever 29 is pivoted by the drive force of the second motor 12, which is separate from the first motor 11, to move the fifth axis L5, which is located on the distal end portion of the second drive lever 29, toward the upper side of the windshield 1. This varies and enlarges the wiping range of the first wiper blade 36 (to enlarged range Z2). Thus, locations proximate to the upper corner of the windshield 1 can be wiped. Further, the enlarged range Z2 can be varied by varying the rotation generated by the second motor 12, that is, the movement amount and moved time (wiping angle position) of the fifth axis L5.

(3) The vehicular wiper device 2 includes the second wiper arm 17, which is driven by the drive force of the first motor 11. The second wiper blade 18 is coupled to the distal end portion of the second wiper arm 17 to wipe the windshield 1. The first and second wiper arms 35 and 17 can be driven with the drive force of the first motor 11 without using a separate drive source. Further, the second motor 12 drives the second drive lever 29 so that the second wiper blade 18 can wipe a varied and enlarged wide wiping range, namely, the enlarged range Z2.

(4) The swing mechanism is a swing link mechanism, and the swing link mechanism includes the first drive lever 26, which includes a basal end portion that is pivotal about the first axis L1 located at a fixed position relative to the vehicle body and which is pivoted by the drive force of the first motor 11, and the arm head 33, which moves integrally with the first wiper arm 35 that is pivoted when the first drive lever 26 pivots. This obtains the advantages specifically described above.

(5) The second drive lever 29 is an extending mechanism (axis moving mechanism) that moves the swing axis (fifth axis L5) of the arm head 33 with the drive force of the second motor 12 in the top-to-bottom direction of the windshield 1. This obtains the advantages specifically described above.

The drive force of the first motor 11 pivots the first drive lever 26. The first drive lever 26 pivots the first driven lever 32 and the arm head 33, and the first wiper arm 35 is pivoted together with the arm head 33. Further, when the drive force of the second motor 12 pivots the second drive lever 29, the fifth axis L5, which serves as a swing axis located on the distal end portion of the second drive lever 29, is moved in the top-to-bottom direction of the windshield 1 to perform an extending or drawing action. This obtains the advantages specifically described above.

(6) The position of the fifth axis L5 when the first wiper blade 36 is located at the lower reversing position is defined as the standard position. In the present embodiment, the fifth axis L5 is also located at the same standard position when the first wiper blade 36 is located at the upper reversing position. The wiping range of the first wiper blade 36 when the fifth axis L5 is located at the standard position is defined as the standard range Z1. The wiping range of the first wiper blade 36 when the fifth axis L5 is located toward the upper side of the windshield 1 is defined as the enlarged range Z2 that is enlarged from the standard range Z1. The controller 41 drives and controls the first and second motors 11 and 12 to switch between standard drive that moves the first wiper blade 36 with the first motor 11 to wipe the standard range Z1 and enlargement drive that moves the first wiper blade 36 with the first and second motors 11 and 12 to wipe the enlarged range Z2. Thus, the standard drive and enlargement drive allows for variable wiping of a wide range. More specifically, when only performing enlargement drive, the basal end of the first wiper blade 36 would move over an extended path and not wipe the windshield 1 in a range at the basal side of the extended path. By switching to the standard drive, the enlarged range Z2 and the standard range Z1 including the range at the basal side of the path are both wiped. This allows for variable wiping over a wide range.

(7) The controller 41 drives and controls the second motor 12 to perform the enlargement drive during one of forward movement and backward movement of the first wiper blade 36 and perform the standard drive during the other one of forward movement and backward movement of the first wiper blade 36. Thus, the standard drive and the enlargement drive allows for variable wiping over a wide range whenever the first wiper blade 36 moves back and forth.

(8) The second motor 12 and the second drive lever 29 are linked by the rotation restriction link mechanism (second drive crank arm 14, third coupling rod 31, and second passenger seat side swing lever 28) that is configured so that when the fifth axis L5 is located at the standard position, the rotation shaft 12a of the second motor 12 is at the dead center and cannot be rotated even when applying rotation force to the second drive lever 29. Thus, the fifth axis L5 can be mechanically held at the standard position without generating holding torque with the second motor 12. As a result, there is no need to supply power to the second motor 12 during standard drive and, for example, power consumption can be reduced. Further, even when the second motor 12 becomes defective, standard drive can be performed.

(9) The first drive lever 26 is pivoted in a range located downward from the first axis L1 on the windshield 1. Thus, the first drive lever 26, the second drive lever 29, the first driven lever 32, and the basal end portion of the arm head 33 (portion forming second driven lever) are practically hidden from, for example, the passenger compartment.

(10) The first axis L1 of the first drive lever 26 and the second axis L2 of the second drive lever 29 lie along the same line L. This reduces the area occupied by the first drive lever 26 and the second drive lever 29 as viewed from the axial direction in comparison with when the first axis L1 is separated from the second axis L2.

(11) The length from the first axis L1 to the third axis L3 and the length from the fourth axis L4 to the fifth axis L5 are set to be the same, and the length from the third axis L3 to the fourth axis L4 and the length from the first axis L1 to the fifth axis L5 are set to be the same. This obtains a link mechanism having the form of a parallelogram in which the first drive lever 26 is parallel to the arm head 33, and the second drive lever 29 is parallel to the first driven lever 32. Thus, for example, in the present embodiment, the link mechanism is folded at the stop position so that the second drive lever 29 is located proximate to the first driven lever 32. This minimizes the occupied space at the stop position. Further, the link mechanism can be accommodated in a small space at the lower side of the windshield 1.

(12) The second drive lever 29 and the first driven lever 32 respectively include the cover members 51 and 52 that extend over and cover the section encompassed by the levers (first drive lever 26, second drive lever 29, first driven lever 32, and arm head 33). This prevents foreign matter from being caught between the levers when the levers pivot. In addition, the cover members 51 and 52 have the overlapping portion Y of which the overlapping area varies in accordance with the pivot state of the levers. When the area of the encompassed section increases, the area of the overlapping portion Y decreases. When the area of the encompassed section decreases, the area of the overlapping portion Y increases. Thus, a suitable amount (area) can be covered in accordance with the encompassed area. More specifically, the cover members 51 and 52 prevent foreign matter from being caught by covering a large section when there is an increase in the area of the section encompassed by the levers (first drive lever 26, second drive lever 29, first driven lever 32, and arm head 33). Further, the cover members 51 and 52 are decreased in area when the area of the encompassed section decreases. This improves the appearance as viewed from the outside and inside of the vehicle.

(13) The area of the overlapping portion Y of the cover members 51 and 52 is varied to constantly cover (in any state) the entire section encompassed by the levers (first drive lever 26, second drive lever 29, first driven lever 32, and arm head 33). Thus, the cover members 51 and 52 constantly prevent foreign matter from being caught between levers when the levers pivot.

(14) The cover members 51 and 52 are configured to cover the coupling pins 53 to 55 and the second passenger seat pivot shaft 22 that serve as the pivot axes of the levers (first drive lever 26, second drive lever 29, first driven lever 32, and arm head 33). Thus, in comparison with when the coupling pins 53 to 55 and the second passenger seat pivot shaft 22 are exposed to the outside, for example, the appearance can be improved. Further, for example, the coupling pins 53 to 55 and the second passenger seat pivot shaft 22 are shielded from rain and the formation of rust about their axes can be hindered.

(15) The cover members 51 and 52 are arranged so that when the first wiper arm 35 and the first wiper blade 36 are located along the lower end of the windshield 1 at the stop position, the cover member 51 arranged on the upper second drive lever 29 lies over the outer surface of the cover member 52 arranged on the lower first driven lever 32 (surface located upward with respect to planes of FIGS. 9 and 11). This minimizes steps that are recognizable from the outer side during wiping actions. If a cover member arranged on the first driven lever 32 were to be arranged to lie over the outer surface (surface farther from windshield 1) of a cover member arranged on the upper second drive lever 29, a step would be formed between the upper edge of the lower cover member and the upper cover member. Since the step would be formed at the upper side, the step would easily be recognized from the outer side. In the structure described above, a step is formed between the lower edge of the upper cover member 51 and the lower cover member 52. Since the step is formed at the lower side, the step can be accommodated, for example, at the inner side of the hood so that it cannot be recognized from the outside during wiping actions. Further, by arranging the cover member 51 to lie over the outer surface of the cover member 52, a step is formed descending from the upper side (upper side of windshield 1) to the lower side (inner side of vehicle body). This reduces foreign matter such as snow or twigs that become caught. Thus, foreign matter is prevented from interfering with the pivoting of the levers (first drive lever 26, second drive lever 29, first driven lever 32, and arm head 33).

(16) The cover members 51 and 52 that are overlapped with each other include surfaces (opposing surfaces when overlapped) with the projections 52*b*. In the present embodiment, the projections 52*b* are formed on the outer side (upper side as viewed in FIG. 13) of the cover member 52 arranged on the first driven lever 32. Thus, even when relatively moving the cover members 51 and 52 so that they slide along and contact each other, the slide resistance can be reduced.

The above embodiment may be modified as described below.

Figure 14:
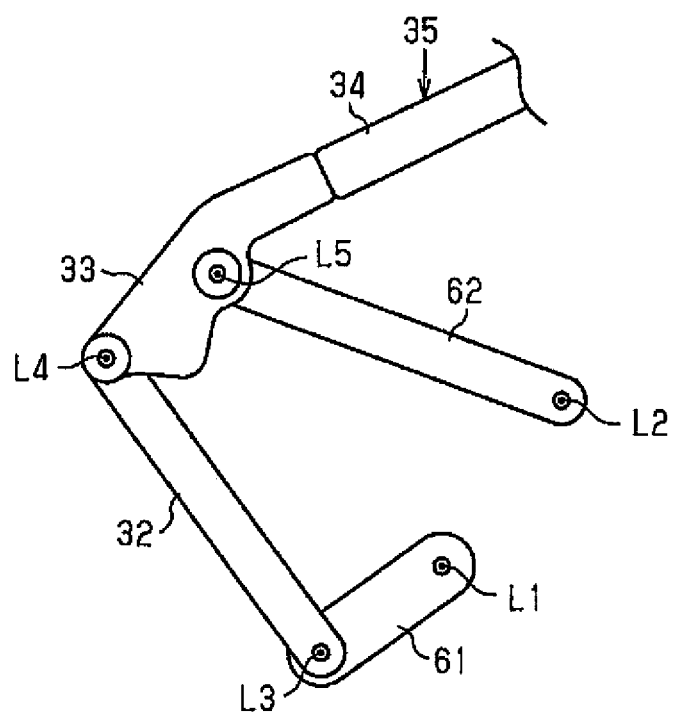
FIG. 14 is a plan view illustrating a further example of the vehicular wiper device.

In the above embodiment, the first axis L1 of the first drive lever 26 and the second axis L2 of the second drive lever 29 lie along the same line L (concentrically). Instead, for example, as shown in FIG. 14, the first axis L1 of a first drive lever 61 may be separated from the second axis L2 of a second drive lever 62. In such a case, when producing a wiping action with a first wiper blade by pivoting the first drive lever 61 with the drive force of a first motor, the wiping range of a first wiper blade can be enlarged by pivoting the second drive lever 62 with the drive force of the second motor and upwardly moving the fifth axis L5, which is located on the distal end portion of the second drive lever 62. This allows the first drive lever 61 and the second drive lever 62 to be supported by a structure that is simpler than the embodiment described above.

In the embodiment described above, the vehicular wiper device 2 includes the second wiper arm 17 driven by the drive force of the first motor 11. The second wiper blade 18, which is coupled to the distal end portion of the second wiper arm 17, wipes the windshield 1. Instead, for example, a separate motor can be used to drive the second wiper arm 17. Alternatively, for example, the second wiper arm 17 and the second wiper blade 18 may be omitted from the vehicular wiper device. In these cases, the first motor 11 is drive-coupled to the first drive lever 26 without the second coupling rod 27.

The controller 41 that drives and controls the first motor 11 and the second motor 12 may be used as an ECU of the vehicle. Alternatively, a control motor may be installed in at least one of the first motor 11 and the second motor 12, for example, the second motor 12.

In the above embodiment, among the first motor 11 and the second motor 12, the second motor 12 is controlled to be rotatable in forward and reverse directions. Instead, the first motor 11 may be a control motor that is rotatable in forward and reverse directions. Alternatively, the first motor 11 and the second motor 12 may both be control motors that are rotatable in forward and reverse directions.

Figure 15:
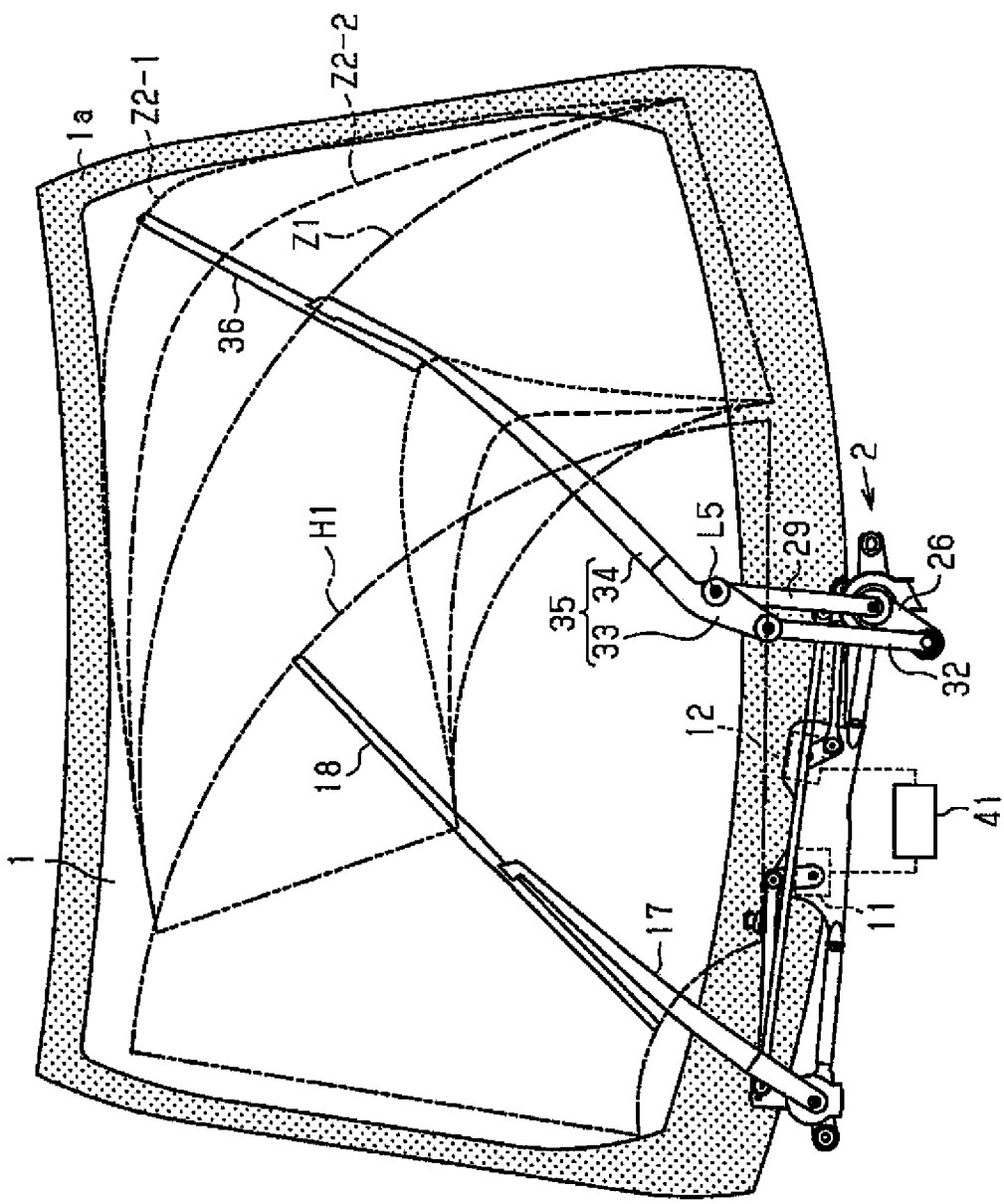
FIG. 15 is a schematic diagram showing part of a vehicle including the further embodiment of the vehicular wiper device.

In the above embodiment, the controller 41 switches between standard drive and enlargement drive. Instead, for example, a controller may perform only enlargement drive. Further, the controller performs enlargement drive during a forward movement and switches to standard drive during a backward movement. Instead, for example, the controller may perform standard drive during a forward movement and switch to standard drive during a backward movement. Further, for example, the standard drive and enlargement drive may be alternately switched whenever a single reciprocation is completed. In the above embodiment, standard drive and enlargement drive are switched to perform two types of driving patterns (wipe standard range Z1 and enlarged range Z2 as wiping ranges). However, three or more types of driving patterns may be switched. For example, as shown in FIG. 15, wiping may be performed by switching between enlargement drive that wipes an enlarged range Z2-1, which corresponds to the enlarged range Z2, and an enlarged range Z2-2 (wiping range in which extended amount of first wiper arm is smaller than that for enlarged range Z2-1) and standard drive that wipes the standard range Z1. In other words, the extension amount of the first wiper arm 35 may be varied to vary the enlarged range Z2. The wiping range refers to the range wiped by the first wiper blade 36, and the wiping ranged may be varied in wiping area and wiping shape.

The controller 41 of the above embodiment drives and controls the first motor 11 and the second motor 12 based on rotation positions signals (drive state signals) corresponding to the rotation positions (pivot angles) of the rotation shafts 11a and 12a received from the first motor 11 and the second motor 12. The controller 41 can also drive and control the second motor 12 based on a rotation position signal (drive state signal) corresponding to the rotation position (pivot angle) of the rotation shaft 11a received from the first motor 11 to extend and draw the first wiper arm 35 with the extending mechanism in correspondence with the wiping action of the first wiper arm 35 produced by the swing mechanism.

In the present embodiment, the second motor 12 is linked to the second drive lever 29 by the rotation restriction link mechanism (second drive crank arm 14, third coupling rod 31, and second passenger seat side swing lever 28) set to be at the dead center when the fifth axis L5 is located at the standard position. However, the second motor 12 and the second drive lever 29 do not have to be linked by the rotation link mechanism.

In the above embodiment, the first drive lever 26 is pivoted within a range located downward from the first axis L1 but may be configured to pivot in a range located upward from the first axis L1.

In the above embodiment, the length from the first axis L1 to the third axis L3 and the length from the fourth axis L4 to the fifth axis L5 are set to be the same, and the length from the third axis L3 to the fourth axis L4 and the length from the first axis L1 to the fifth axis L5 are set to be the same. However, the lengths may be changed to differ from each other.

In the above embodiment, enlargement drive and standard drive are alternately performed to eliminate a non-wiped portion at the inner side of the path of the basal end portion of the first wiper blade 36 resulting from enlargement drive (when performing variable enlargement). Instead, the non-wiped portion may be, for example, reduced in size or eliminated by a second wiper blade.

Figure 16:
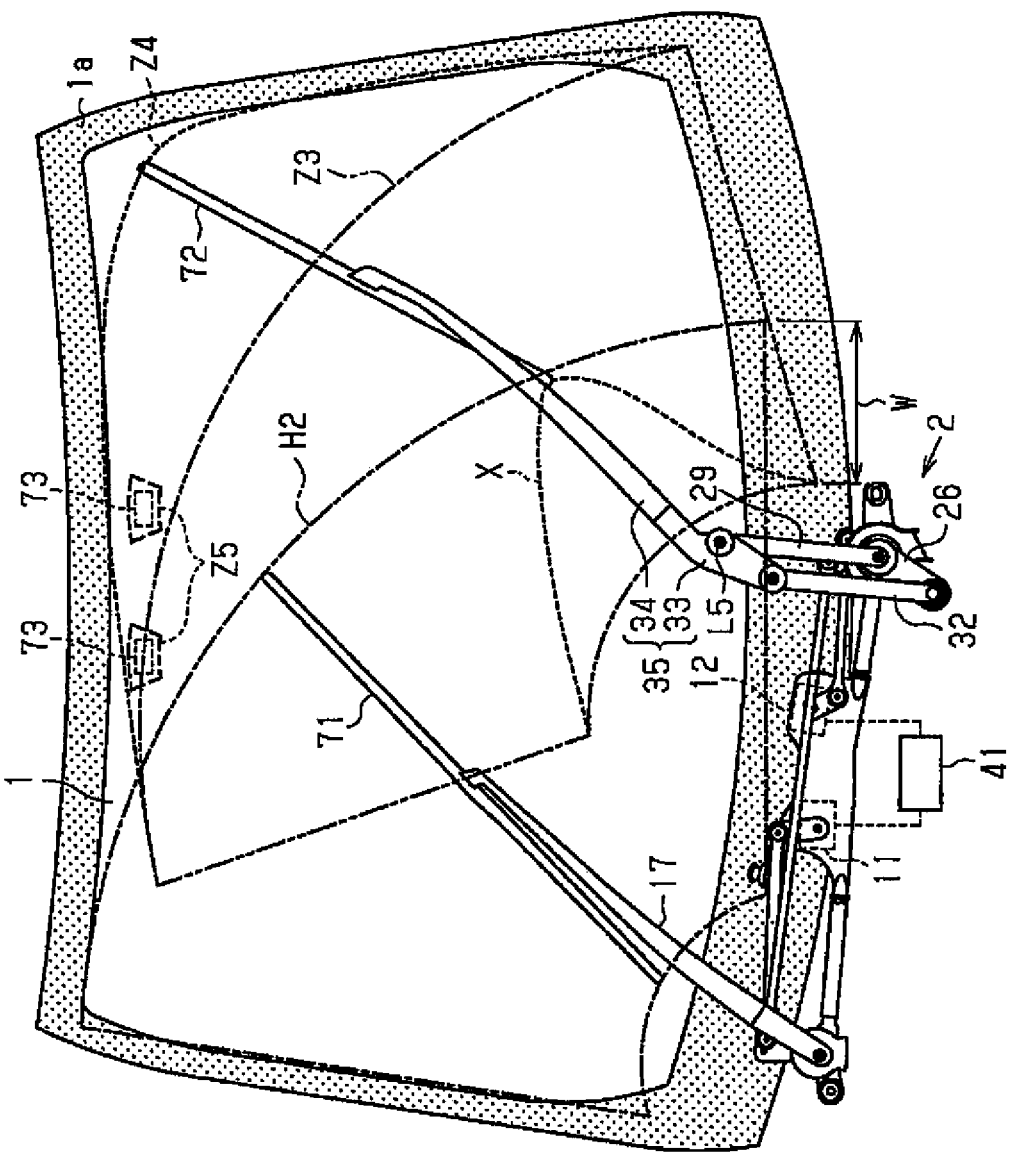
FIG. 16 is a schematic diagram showing part of a vehicle including the further embodiment of the vehicular wiper device.

For example, a change may be made as shown in FIG. 16. In this example (refer to FIG. 16), when a second wiper blade 71 is located at a lower reversing position, the second wiper blade 71 is located at a position (driver seat side) separated in the vehicle widthwise direction from a first wiper blade 72 (passenger seat side), and the distal end portion of the second wiper blade 71 is arranged overlapping the basal end portion of the first wiper blade 72 in the top-to-bottom direction (wiping direction) extending along the surface of the windshield 1. In other words, when located at the lower reversing position (stop position), the distal end portion of the second wiper blade 71 and the basal end portion of the first wiper blade 72 are set to form an overlapping range W overlapped in the top-to-bottom direction along the surface of the windshield 1. Thus, the non-wiped portion formed when varying and enlarging the wiping range (i.e., enlarged range Z4) of the first wiper blade 72 is reduced in size or eliminated.

In this example (refer to FIG. 16), the second wiper blade 71 is set so that its wiping range H2 includes the entire path X of the basal end portion of the first wiper blade 72. In detail, the controller 41 of this example drives and controls the first motor 11 and the second motor 12 so that the enlargement drive of the above embodiment is constantly performed when the first wiper blade 72 moves forth and moves back. Further, regardless of whether the first wiper blade 72 is moving forth or moving back, the wiping range of the first wiper blade 72 is an enlarged range Z4, which is enlarged from a standard range Z3. The overlapping range W and the length of the second wiper blade 71 are set so that the wiping range H2 of the second wiper blade 71 entirely includes the movement path of the first wiper blade 72 during the enlargement drive (but excludes portion of movement path located downward from lower reversing position (stop position) of second wiper blade 71. This eliminates a non-wiped portion from the wiping range of the first wiper blade 72 (i.e., enlarged range Z4).

Further, in this example (refer to FIG. 16), the enlarged range Z4, which is the wiping range of the first wiper blade 72, is set to include a function areas Z5 in the windshield 1 used by cameras 73, which function as wiping surface usage devices. More specifically, two frontal recognition cameras 73 are fixed to the ceiling in the passenger compartment of the vehicle in this example, and the ranges captured by the cameras 73 on the windshield 1 are the function areas Z5. The standard range Z3 of the first wiper blade 72 includes only part of the function areas Z5. However, the enlarged area Z4 is set to entirely include the function areas Z5. Thus, in this example, the function areas Z5 are entirely wiped, and the cameras 73 (frontal recognition function of cameras 73) can be used in a satisfactory manner. The term of wiping surface usage devices refer to devices that output information obtained through the wiping surface as signals and specifically refer to cameras, raindrop sensors, and the like.

In the above embodiment, the swing mechanism (swing link mechanism) is configured by the first drive lever 26, the first driven lever 32, and the arm head 33 but may be changed to another configuration as long as the first wiper arm 35 can be driven by the drive force of the first motor 11, which is fixed to the vehicle body, to swing back and forth In the above embodiment, the extending mechanism (axis moving mechanism) is configured by the second drive lever 29 but may be changed to another configuration as long as the first wiper arm 35 can be driving by the second motor 12 fixed to the vehicle body to extend in the longitudinal direction.

In the above embodiment, the arm head 33 (second driven lever) includes a basal end portion that is coupled to the first driven lever 32 pivotally about the fourth axis L4 at the distal end portion of the first driven lever 32 and a distal end portion that is coupled to the second drive lever 29 pivotally about the fifth axis L5 at the distal end portion of the second drive lever 29. Instead, for example, the second driven lever may include a distal end portion that is coupled to the first driven lever 32 pivotally about the fourth axis L4 at the distal end portion of the first driven lever 32 and a basal end portion that is coupled to the second drive lever 29 pivotally about the fifth axis L5 at the distal end portion of the second drive lever 29.

In the above embodiment, the two cover members 51 and 52 are respectively arranged on two of the four levers (first drive lever 26, second drive lever 29, first driven lever 32, and arm head 33) in the vehicular wiper device 2. However, a vehicular wiper device only needs to include three or more levers, with cover members arranged only on at least two of the cover members.

For example, in a vehicular wiper device that is provided with a four-joint link mechanism including three levers, cover members may be arranged on two or more of the levers. Further, for example, cover members may be arranged on three or more of the levers. The cover members need to be arranged so that the area of the overlapping portion Y decreases as the area of the encompassed section increases in accordance with the pivot state of the cover members and so that the area of the overlapping portion Y increases as the area of the encompassed section decreases.

In the above embodiment, the cover members 51 and 52 are formed to constantly (in any state) cover the entire section encompassed by the levers (first drive lever 26, second drive lever 29, first driven lever 32, and arm head 33). Instead, the cover members 51 and 52 may be shaped so as not to cover part of the section encompassed by the levers.

In the above embodiment, the cover members 51 and 52 are arranged to cover the coupling pins 53 to 55 and the second passenger seat pivot shaft 22 that serve as the pivot axes of the levers (first drive lever 26, second drive lever 29, first driven lever 32, and arm head 33) but may instead be shaped, for example, not to cover the rotation axes. Further, the cover members 51 and 52 may be shaped to cover, for example, only one of, two of, or three of the pivot axes (coupling pins 53 to 55 and second passenger seat pivot shaft 22).

In the above embodiment, the cover members 51 and 52 are arranged so that the cover member 51 arranged on the upper second drive lever 29 (located at upper side of windshield 1) lies over the outer surface of the cover member 52 arranged on the lower first driven lever 32 when the first wiper arm 35 and the first wiper blade 36 are located at the stop position. However, this arrangement may be reversed.

Although not particularly mentioned in the description of the above embodiment, in a state located at the stop position, the upper cover member 51 covering the lower cover member 52 extends to the lower end of the cover member 52 (refer to FIG. 9). However, in a state located at the stop position, an upper cover member may be formed to cover a lower cover member without extending to the lower end of the lower cover member (extending to only an intermediate part). In such a case, when located at the step position, a step is formed between the lower edge of the upper cover member and the upper cover member. However, the lower cover member is located at the inner side (proximate to wiping surface). This, for example, facilitates the accommodation of the lower cover member at the inner side of the hood.

In the above embodiment, two projections 52b are formed on the outer surface (upper surface as viewed in FIG. 13) of the cover member 52 arranged on the first driven lever 32. However, the projections 52b may be omitted. Further, there may be one projection 52b or three or more projections 52b. The projections 52b only need to be formed on a surface where the cover members 51 and 52 are overlapped (face each other when overlapped). The projections 52b may be formed on a surface (inner surface) of the cover member 51 opposing the cover member 52. In the above embodiment, when the cover members 51 and 52 are not elastically deformed (free from loads) or not plastically deformed, the projections 52b are spaced apart from the cover member 51 by slight gaps (that is, slides in contact only when deformed). However, the projections 52b may be arranged to contact the cover member 51 even when not elastically or plastically deformed.

The invention claimed is:

1. A vehicular wiper device comprising:
    a first wiper arm including a distal end portion to which a first wiper blade is coupled to wipe a wiping surface of a vehicle;
    a first drive source directly or indirectly fixed to a vehicle body;
    a swing mechanism driven by drive force of the first drive source to swing the first wiper arm back and forth;
    a second drive source separate from the first drive source and directly or indirectly fixed to the vehicle body;
    an extending mechanism driven by drive force of the second drive source to extend or draw the first wiper arm in its longitudinal direction; and
    a controller that drives and controls the first drive source and the second drive source to extend or draw the first wiper arm with the extending mechanism in correspondence with a swinging action of the first wiper arm produced with the swing mechanism,
    wherein
    the swing mechanism is a swing link mechanism, and the swing link mechanism includes:
    a first drive lever including a basal end portion that is pivotal about a first axis located at a fixed position relative to the vehicle body, wherein the first drive lever is pivoted by the drive force of the first drive source; and
    a second driven lever pivoted when the first drive lever is pivoted and moved integrally with the first wiper arm,
    wherein
    the extending mechanism is an axis moving mechanism that moves a swing axis of the second driven lever in a top-to-bottom direction of the wiping surface with the drive force of the second drive source, and
    wherein
    the axis moving mechanism includes a second drive lever including a basal end portion that is pivotal about a second axis located at a fixed position relative to the vehicle body, wherein the second drive lever is pivoted by the drive force of the second drive source.

2. The vehicular wiper device according to claim 1, wherein the controller varies an extension amount of the first wiper arm with the extending mechanism to vary a wiping range of the wiping surface with the first wiper blade.

3. The vehicular wiper device according to claim 1, wherein:
    the swing mechanism includes
    the first drive lever,
    a first driven lever including a basal end portion that is coupled to the first drive lever pivotally about a third axis located on a distal end portion of the first drive lever, and
    the second driven lever including a basal end portion that is coupled to the first driven lever pivotally about a fourth axis located on a distal end portion of the first driven lever and a distal end portion that is coupled to the second drive lever pivotally about a fifth axis located on a distal end portion of the second drive lever.

4. The vehicular wiper device according to claim 3, wherein
the first wiper blade coupled to the distal end portion of the first wiper arm is configured to wipe the wiping surface back and forth between upper and lower reversing positions, and
the first axis and the second axis are arranged to lie along the same line.

5. The vehicular wiper device according to claim 4, wherein
a length from the first axis to the third axis and a length from the fourth axis to the fifth axis are set to be the same, and
a length from the third axis to the fourth axis and a length from the first axis to the fifth axis are set to be the same.

6. The vehicular wiper device according to claim 3, wherein
the fifth axis is located at a position defined as a standard position when the first wiper blade is located at a lower reversing position,
a wiping range of the first wiper blade in a state in which the fifth axis is located at the standard position is defined as a standard range,
a wiping range of the first wiper blade in a state in which the fifth axis is located upward on the wiping surface from the standard position is defined as an enlarged range that is enlarged from the standard range, and
the controller drives and controls the first and second drive sources to switch between standard drive that moves the first wiper blade to wipe the standard range and enlargement drive that moves the first wiper blade to wipe the enlarged range.

7. The vehicular wiper device according to claim 3, wherein
the second drive source and the second drive lever are coupled by a rotation restriction link mechanism that includes:
a second drive crank arm including a basal end portion fixed to a rotation shaft of the second drive source,
a third coupling rod including a basal end portion pivotally coupled to a distal end of the second drive crank arm, and
a second passenger seat side swing lever including a distal end portion pivotally coupled to a distal end of the third coupling rod, and a basal end portion coupled to the second drive lever,
the fifth axis is located at a position defined as a standard position when the first wiper blade is located at a lower reversing position, and
the rotation restriction link mechanism is configured to be located at a dead center that does not allow a rotation shaft of the second drive source to be rotated even when rotation force is applied to the second drive lever.

8. The vehicular wiper device according to claim 3, wherein the first drive lever is pivoted in a range located downward on the wiping surface from the first axis.

9. The vehicular wiper device according to claim 3, wherein
at least two of the first drive lever, the second drive lever, the first driven lever, and the second driven lever that configure levers are respectively provided with cover members that extend over a section encompassed by the levers and cover the encompassed section;
the cover members respectively include overlapping portions that are overlapped with each other;
the overlapping portions have an area that varies in accordance with a pivot state of the levers.

10. The vehicular wiper device according to claim 9, wherein the cover members are configured to constantly and entirely cover the section encompassed by the first drive lever, the second drive lever, the first driven lever, and the second driven lever.

11. The vehicular wiper device according to claim 9, wherein at least one of the cover members is configured to cover at least one pivot axis of the levers.

12. The vehicular wiper device according to claim 9, wherein the cover members are configured so that the cover member arranged on an upper one of the levers lies over an outer surface of the cover member arranged on a lower one of the levers in a state in which the first wiper arm and the first wiper blade extend along a lower end of the wiping surface at a stop position.

13. The vehicular wiper device according to claim 1, further comprising a second wiper arm driven in synchronism with the first wiper arm, wherein the second wiper arm includes a distal end portion to which a second wiper blade is coupled to wipe the wiping surface.

14. The vehicular wiper device according to claim 13, wherein
the second wiper blade is arranged at a position separated from the first wiper blade in a widthwise direction of the vehicle in a state located at a lower reversing position, and
a distal end portion of the second wiper blade is overlapped with a basal end portion of the first wiper blade in a top-to-bottom direction extending along the wiping surface.

15. The vehicular wiper device according to claim 14, wherein a wiping range of the second wiper blade is set to entirely include a movement path of the basal end portion of the first wiper blade.

16. The vehicular wiper device according to claim 1, wherein a wiping range of the first wiper blade is set to include a function area in the wiping surface for use by a wiping surface usage device.

17. The vehicular wiper device according to claim 1, wherein
the controller drives and controls the first drive source to drive the swing mechanism and drives and controls the second drive source to drive the extending mechanism, and
the controller is capable of switching between standard drive that drives and controls the first drive source to wipe a standard range with the first wiper blade and enlargement drive that drives and controls the first drive source and the second drive source to wipe an enlarged range, which is enlarged from the standard range, with the first wiper blade.

18. The vehicular wiper device according to claim 17, wherein the controller controls the second drive source so that the enlargement drive is performed during one of forward movement and backward movement of the first wiper blade, and the standard drive is performed during the other one of the forward movement and the backward movement of the first wiper blade.

* * * * *